United States Patent [19]

Stewart

[11] 3,937,625

[45] Feb. 10, 1976

[54] RADIO FREQUENCY PREPARATION OF PURE GLASS

[75] Inventor: Clive Edward Ernest Stewart, Bishops Stortford, England

[73] Assignee: International Standard Electric Corporation, New York, N.Y.

[22] Filed: Aug. 2, 1974

[21] Appl. No.: 494,155

[30] Foreign Application Priority Data
Aug. 30, 1973 United Kingdom............... 40890/73

[52] U.S. Cl. ...................... 65/136; 65/134; 65/337; 13/6; 13/34
[51] Int. Cl.²..... C03B 5/16; C03B 5/22; C03B 5/02
[58] Field of Search ........ 65/DIG. 4, 134, 337, 336, 65/347, 136; 13/6, 34

[56] References Cited
UNITED STATES PATENTS

| | | | |
|---|---|---|---|
| 1,034,824 | 8/1912 | Owens | 65/337 |
| 1,572,873 | 2/1926 | Allcutt | 65/DIG. 4 |
| 2,186,718 | 1/1940 | Ferguson | 13/6 X |
| 2,402,582 | 6/1946 | Scaff | 65/137 X |
| 2,749,379 | 6/1956 | Geffcken et al. | 13/6 |
| 2,877,280 | 3/1959 | Eden | 65/DIG. 4 |
| 2,930,098 | 3/1960 | Emeis | 65/DIG. 4 |
| 3,156,549 | 11/1964 | Kelemen | 13/6 X |
| 3,205,292 | 9/1965 | Descarsin | 65/DIG. 4 |
| 3,337,675 | 8/1967 | Descarsin | 13/6 |

*Primary Examiner*—S. Leon Bashore
*Assistant Examiner*—Frank W. Miga
*Attorney, Agent, or Firm*—John T. O'Halloran; M. J. Lombardi, Jr.

[57] ABSTRACT

Pure glass is prepared in a water-cooled radio frequency heated silica crucible. An encapsulated graphite susceptor is used to preheat the glass batch material to avoid contamination. The preheater is removed after the r.f. power becomes effective to couple into the melt. The cooling prevents the melt from wetting the crucible and eliminates a further source of contamination.

4 Claims, 1 Drawing Figure

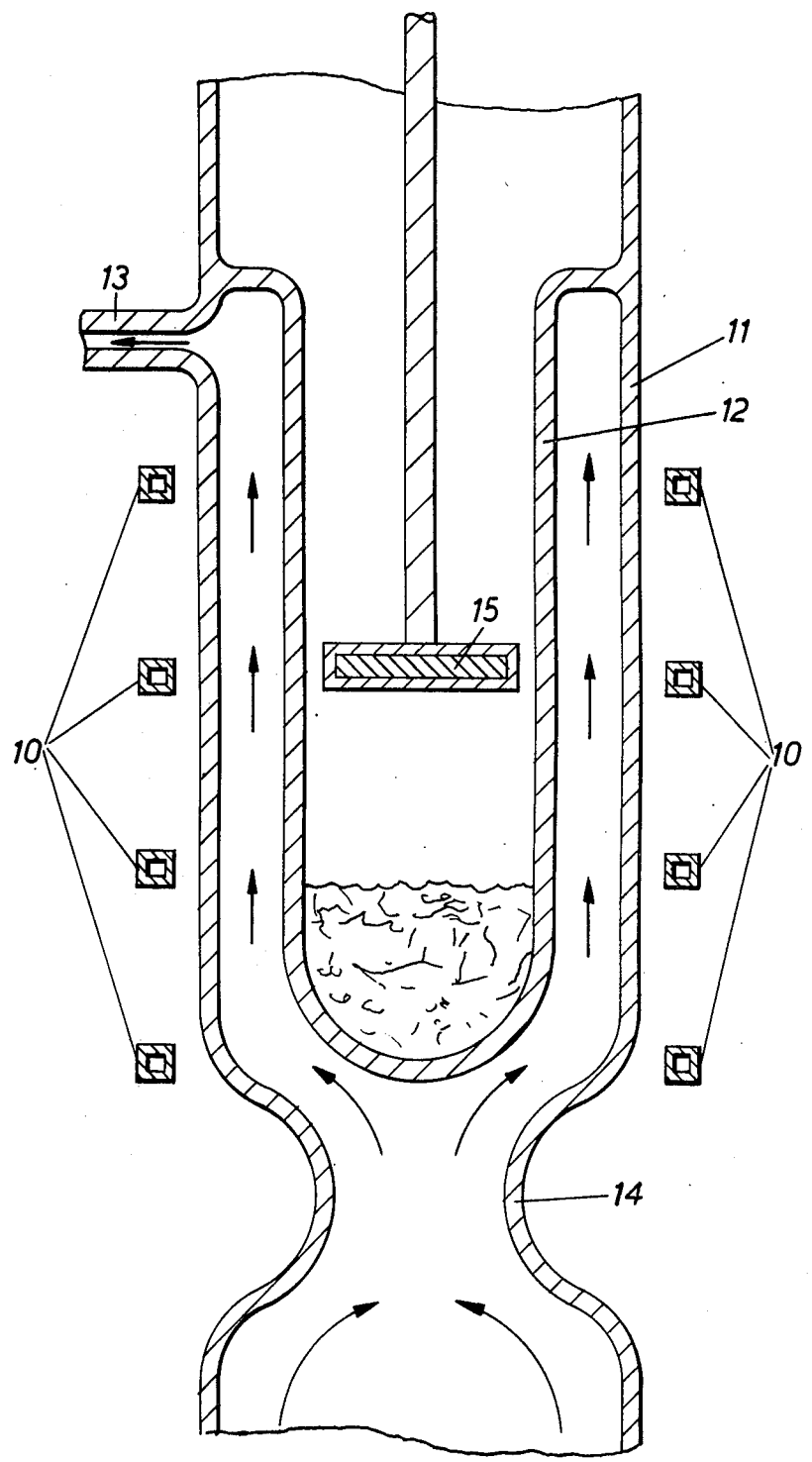

RADIO FREQUENCY PREPARATION OF PURE GLASS

BACKGROUND OF THE INVENTION

1. Field of the Invention

This invention relates to the preparation of glasses from batch materials, and is particularly concerned with the preparation of high purity glasses such as low optical loss glasses required for optical fibre manufacture and those required as host glasses for laser manufacture.

2. Description of the Prior Art

When glasses are prepared in the normal way by heating in an electric or flame furnace, the glass is subject to contamination from three main sources, that from the hot refractory lining of the furnace, that from the heating element or flame, and that from the crucible containing the melt. Two of the factors affecting the amount of contamination are temperature and duration. Hence the contamination which occurs during the initial heating required to cause the batch materials to coalesce is normally less than that which occurs during the longer higher temperature heating required for fining and homogenising the glass. A description of a known system for using radio frequency to prepare pure glass and cooling of crucibles with gas to reduce contamination is found in copending application Ser. No. 479,004, filed June 13, 1974 and assigned to the same assignee as the instant application.

At room temperature the a.c. conductivities of most glasses, and also of their batch constituents, are so low that r.f. inductive heating from room temperature is impractical and hence an alternative method of heating is used to heat the charge to a temperature at which it readily couples into the applied field. With some glasses the conductivity, even in the molten state, is so low that it is preferable to use r.f. dielectric heating and make use instead of dielectric losses. The choice of an appropriate frequency, which may typically lie in the range from one to several thousand MHz will depend upon the electrical properties of the particular glass composition being prepared. Thus the manner of application of the r.f. power will depend upon the absolute values of and upon the rates of change with temperature of both the a.c. conductivity and the dielectric loss, these parameters being in a major way both temperature and frequency dependent. Thus for instance it is known that a typical soda lime glass can be coupled into a 2 – 5 MHz field at about 1000°C. In this instance the coupling is principally inductive, the relatively high conductivity of this glass being attributed to the sodium ion mobility. In contrast to this a glass composed exclusively of silica and lead oxide, which has a low conductivity even when molten, would require dielectric heating at a much higher frequency typically of several thousand MHz. Inductor and capacitor plate combinations (designed for heating other materials) that would be suitable for this purpose are described in the literature.

During the fining and homogenizing stage of glass preparation the contamination of the melt is relatively small because the source of heat is non-contaminating, because contamination by the crucible can be effectively eliminated by cooling it, and because the melt is contained in a clean environment.

If a preheating stage is required to enable the r.f. field to couple into the melt it is preferable to use a non-contaminating heat source. For many applications, contamination is kept within acceptable bounds when preheating is effected by radiated and conducted heat from a susceptor, typically of graphite, placed over or within the charge of batch materials. Contamination by the graphite can be eliminated by encapsulating it in for instance silicon, silica, or silicon carbide. Silicon may be used on its own as an alternative susceptor material. Other methods of preheating include the use of an r.f. excited plasma flame and also the use of focussed radiation from a high power infra-red lamp.

SUMMARY OF THE INVENTION

According to the present invention there is provided an improved method of preparing a glass from batch materials which are placed in a water jacketed dielectric crucible. The heating required for fining and homogenizing the glass is provided by radio frequency (r.f.) heating of the melt. This method allows the crucible to be maintained at a lower temperature. Preferably, the crucible is made of silica. The water cooling of the crucible prevents the melt from wetting the crucible and avoids contamination.

An embodiment of the invention will now be described with reference to the accompanying drawing.

BRIEF DESCRIPTION OF THE DRAWING

The single FIGURE depicts apparatus for preparing a glass from batch materials by r.f. inductive heating using a silica encapsulated graphite susceptor for preheating.

DESCRIPTION OF THE PREFERRED EMBODIMENTS

The water cooled work coil 10 of an r.f. induction heater operating at between 2 and 6 MHz, and capable of delivering 25 KW of r.f. power into a suitable load surrounds a silica tube 11. Inside the tube 11 is located a silica crucible 12 whose mouth is sealed to the wall of the tube. In this way a water jacket for the crucible is formed. Cooling water flows upward from beneath the crucible and flows out of the water-jacket via a pipe 13. The tube 11 is provided with a constriction 14 to improve the water flow around the base of the crucible.

The work coil 10 is also water cooled, and consists of four turns of copper tubing, the coil having an axial length of about 10 cm. and an internal diameter of about 7 cm. The crucible is about 8 cm. high and has an internal diameter of about 5.5 cm.

A number of soda-lime-silica glasses with compositions in the range:

| | |
|---|---|
| $Na_2O$ | 20 – 25 wt% |
| CaO | 3 – 6 wt% |
| $SiO_2$ | 70 – 75 wt% | were prepared in this apparatus using a frequency of 3.5 to 4 MHz and with a flow rate of cooling water for the crucible in excess of 180 liters per hour.

A 500 gram charge of powdered batch material was prepared for each composition, carbonates being used to give the soda and the lime content. The crucible was filled to a depth of about 2 cm. with a portion of the charge, and then a silica encapsulated graphite susceptor 15 was lowered into the work coil to a position above the surface of the material in the crucible. The susceptor heats the batch material causing it to react, evolve gas, and begin to coalesce. At this stage the temperature of the melt is between about 800° and 1000°C, the resistivity is about 5 ohm cm. or less, and the r.f. power begins to couple directly into the melt. This change of power distribution produces changes in the load which are noted by monitoring the r.f. power supply.

Next the susceptor is removed from the crucible, and then the rest of the charge of batch material is added to the melt. This is done a little at a time so that the evolution of gases will not cause any batch material to be ejected from the crucible. Typically the material is added in portions of about 40 – 50 grams. The r.f. conditions may require slight adjustment during the addition of this extra material.

After all the batch material has been added to the melt, a lid (not shown) is placed over the mouth of the crucible so as to assist fining by reducing the temperature gradients within the melt.

For fining and homogenizing the melt, it is initially taken up to a temperature of about 1600°C for two hours, and then the temperature is lowered to about 1500°C for a further heating period of about three hours. During all this time the continuous flow of water keeps the silica crucible at a much lower temperature. The bulk of the resulting glass is substantially seed free, but a small amount of seed is liable to be trapped in the body of the melt along the crucible axis.

An alternative fining and homogenizing process which produces less seed involves mechanical stirring of the melt. First the glass is heated to about 1600°C without the lid. At this stage an air cooled cold finger silica stirrer (not shown) is dipped into the crucible to substantially the bottom of the melt and is mechanically agitated for half an hour. At the end of this period the stirrer is removed, the lid placed in position, and the melt maintained at about 1600°C for another half hour before being brought down to about 1500°C for a further period of two hours.

When the stirrer is removed from the melt it takes a small quantity of the melt with it, and when this cools it tends to shatter the stirrer. If instead the stirrer is water cooled the melt-glass falls away from the stirrer on cooling without damaging the stirrer. However, the use of a water-cooled silica stirrer is hazardous because water would be discharged into the melt if it should fracture on entry. For this reason a preferred alternative stirrer is a water-cooled silver one. This may take the form of a simple U-tube. Any contamination on its surface becomes trapped when it enters the melt by the layer of glass which immediately freezes around it, and this contamination is removed from the melt when the stirrer is removed.

The cooling of the crucible, which has a wall thickness of about 1.5 mm is so great that the melt does not wet it. If the melt is solidified and removed from the crucible as a block its surface will be found to have a frosted appearance in those regions where it was in contact with the crucible walls. This is caused by the presence of unreacted batch material.

An r.f. excited plasma flame may be used in place of the susceptor for preheating the batch material. For this purpose a cyclone type gas flow is set up above the charge by fitting a top (not shown) to the tube 11 which has a pipe which is substantially tangential to the tube, and another which is axial. Gas is caused to enter by the former and leave by the latter. The plasma is initiated in argon and then the gas flow is changed to nitrogen.

Yet another way of preheating involves focussing the infra-red emission of a high power infra red lamp upon a portion of the charge in the crucible. With certain glass compositions the coupling of the r.f. power is facilitated by having the constituents of the batch material substantially unmixed and by arranging that the focussed radiation is concentrated upon a selected component which is able to couple in the r.f. power at a lower temperature than the other constituents.

It is to be understood that the foregoing description of specific examples of this invention is made by way of example only and is not to be considered as a limitation on its scope.

What is claimed is:

1. A method of preparing glass including placing glass batch materials in a crucible, inserting an encapsulated contamination-free susceptor into the crucible, applying a radio frequency field to heat the susceptor to melt the glass, removing the susceptor and applying said radio frequency field to further heat the melt for fining and homogenizing the glass, and cooling the crucible with liquid to provide a lower temperature than the melt to prevent the melt from wetting the crucible.

2. The method as claimed in claim 1 wherein the crucible is made of silica and includes a water jacket, cooling water being passed through the jacket over the base of the crucible.

3. The method as claimed in claim 1 wherein the susceptor is positioned in the batch material in the crucible during preheating.

4. The method as claimed in claim 1 wherein the susceptor is of silica encapsulated graphite.

* * * * *